(12) United States Patent
Vemula et al.

(10) Patent No.: US 11,507,692 B2
(45) Date of Patent: Nov. 22, 2022

(54) SYSTEM AND METHOD FOR IMPROVED ANONYMIZED DATA REPOSITORIES

(71) Applicant: ServiceNow, Inc., Santa Clara, CA (US)

(72) Inventors: Anil Kumar Vemula, Hyderabad (IN); Amitav Mohanty, Hyderabad (IN); Sreenivas Durvasula, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 410 days.

(21) Appl. No.: 16/731,621

(22) Filed: Dec. 31, 2019

(65) Prior Publication Data
US 2021/0200901 A1 Jul. 1, 2021

(51) Int. Cl.
*G06F 21/62* (2013.01)
*G06F 7/24* (2006.01)
*G06K 9/62* (2022.01)

(52) U.S. Cl.
CPC ............ *G06F 21/6254* (2013.01); *G06F 7/24* (2013.01); *G06K 9/6223* (2013.01); *G06K 9/6224* (2013.01)

(58) Field of Classification Search
CPC ..... G06F 21/6254; G06F 7/24; G06K 9/6223; G06K 9/6224
See application file for complete search history.

(56) References Cited

U.S. PATENT DOCUMENTS

| | | |
|---|---|---|
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,593,548 B2 | 9/2009 | Dharmarajan et al. |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |

(Continued)

OTHER PUBLICATIONS

Kerkri et al.; "An approach for integrating heterogeneous information sources in a medical data warehouse", Journal of Medical Systems, vol. 25, No. 3, Jan. 1, 2001; pp. 167-176 {XP055038699}.

(Continued)

*Primary Examiner* — Joseph P Hirl
*Assistant Examiner* — Stephen T Gundry
(74) *Attorney, Agent, or Firm* — Fletcher Yoder PC

(57) ABSTRACT

A computing system includes an anonymizer server. The anonymizer server is communicatively coupled to a data repository configured to store a personal identification information (PII) data. The anonymizer server is configured to perform operations including receiving an anonymized data request, and creating an anonymized data repository based on the anonymized data request. The anonymizer server is also configured to perform operations including anonymizing the PII data to create an anonymized data by applying a cluster-based process, and storing the anonymized data in the anonymized data repository.

16 Claims, 13 Drawing Sheets

(56) References Cited

U.S. PATENT DOCUMENTS

| | | |
|---|---|---|
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,949,209 B2 | 2/2015 | Khin et al. |
| 9,065,783 B2 | 6/2015 | Ding |
| 9,122,552 B2 | 9/2015 | Whitney |
| 9,239,857 B2 | 1/2016 | Trinon |
| 9,298,941 B2 | 3/2016 | Stolberg et al. |
| 9,363,252 B2 | 6/2016 | Mueller |
| 9,535,737 B2 | 1/2017 | Joy |
| 11,087,004 B2* | 8/2021 | Sunkavally ........ G06Q 10/0635 |
| 11,093,641 B1* | 8/2021 | Whalen ................ G06F 16/906 |
| 11,132,386 B2* | 9/2021 | Antonatos ........ G06F 16/24578 |
| 11,157,525 B2* | 10/2021 | Wilshinsky ........... G06F 16/285 |
| 11,158,016 B2* | 10/2021 | Varga ................ G06Q 50/2057 |
| 2019/0087604 A1* | 3/2019 | Antonatos ........... G06F 21/6245 |
| 2020/0250315 A1* | 8/2020 | Sunkavally ......... G06F 21/6254 |
| 2020/0265069 A1* | 8/2020 | Antonatos ........... G06F 21/6254 |
| 2020/0302564 A1* | 9/2020 | Varga ................ G06F 16/24578 |
| 2020/0311304 A1* | 10/2020 | Parthasarathy ..... G06F 11/3006 |
| 2020/0320406 A1* | 10/2020 | Antonatos ........... G06F 21/6254 |
| 2021/0026982 A1* | 1/2021 | Amarendran ....... G06F 21/6245 |
| 2021/0026986 A1* | 1/2021 | Woessner ........... G06F 21/6263 |
| 2021/0026987 A1* | 1/2021 | Woessner ........... G06F 21/6254 |
| 2021/0133557 A1* | 5/2021 | Iyoob ...................... G06N 3/08 |
| 2021/0133801 A1* | 5/2021 | Adi ..................... G06F 21/6245 |
| 2021/0150269 A1* | 5/2021 | Choudhury .......... G06K 9/6247 |
| 2021/0165911 A1* | 6/2021 | Huang ................. G06F 16/906 |
| 2021/0173854 A1* | 6/2021 | Wilshinsky ........ G06Q 30/0201 |
| 2021/0248268 A1* | 8/2021 | Ardhanari ............. G06F 21/602 |
| 2022/0014560 A1* | 1/2022 | Crabtree ............. G06F 16/2477 |
| 2022/0050921 A1* | 2/2022 | LaFever ................ G16H 40/67 |

OTHER PUBLICATIONS

Ravikumar, "A Survey on Recent Trends, Process and Development in Data Masking for Testing"; IJCSI International Journal of Computer Science Issues ISSN, Mar. 15, 2011, pp. 1694-1814 {XP055350766}.

* cited by examiner

SYSTEM AND METHOD FOR IMPROVED ANONYMIZED DATA REPOSITORIES

BACKGROUND

The present disclosure relates generally to data repositories and, more particularly, to anonymized data repositories.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Within the context of cloud computing solutions for data repositories, users may be asked to deal with ever increasing amounts of data, e.g., including certain Personally Identifiable Information (PII) stored in the data repositories. In fact, the amount of cloud-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of data to properly and efficiently perform their job functions. In certain embodiments, cloned data repositories may be created. With this in mind, the following embodiments are directed to improving the manner in which PII data may be derived for certain data repositories, including cloned data repositories.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable customized systems and methods to anonymize such data, creating anonymized repositories (e.g., database tables, files, repository clones, and so on) of certain databases, including cloud-based databases. More specifically, the techniques described herein may include data transformations that transform the Personally Identifiable Information (PII) in a non-anonymized data repository into information that no longer identifies the individual or entity and saves the transformed information in the anonymized data repository clone or instance. In some embodiments, the newly anonymized data repository may be created via a cluster-based process, as further described below.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
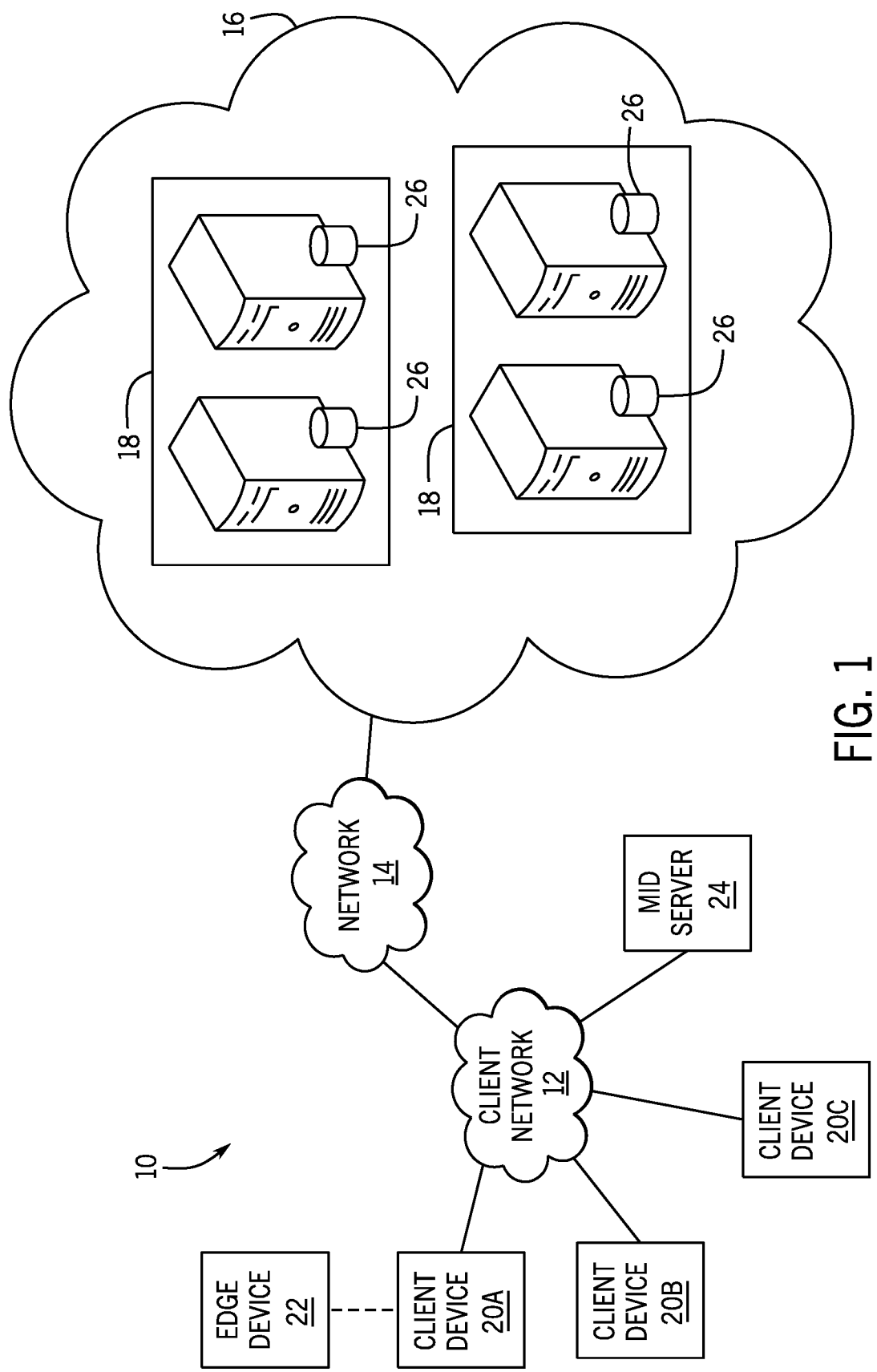
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the terms alerts, incidents (INTs), changes (CHGs), and problems (PRBs) are used in accordance with the generally accepted use of the terminology for configuration management databases (CMDBs). Moreover, the term "issues" with respect to a CI of a CMDB collectively refers to alerts, INTs, CHGs, and PRBs associated with the CI. As used herein, the term "Personally Identifiable Information (PII)" may refer to data that includes information that may identify certain entities, including users, and that may fall under regulatory purview, such as under the United States' Health Insurance Portability and Accountability Act (HIPAA), the European Union (EU) data protection directives (e.g., Directive 95/46/EC), and so on.

Present embodiments are directed creating one or more anonymized data repository clones or instances from a non-anonymized data repository via techniques such as an improved anonymization algorithm that is mostly independent of a K value, where K is a level of K-anonymity further described below. More specifically, the techniques described herein may include data transformations, such as one-way data transformations that transform the PII in the non-anonymized data repository into information that no longer identifies the individual or entity via the improved anonymization algorithm, and that saves the transformed information in the anonymized data repository clone or instance. As used herein, "one-way" data transformations may include data masking and/or data morphing, as well as one-way functions, such as cryptographic hash functions, Rabin functions, elliptic curve functions, and the like, that transform an input (e.g., character string, number, data array, and so on) into an output data such that retrieving the original input from the output data may be computationally "hard", e.g., non-deterministic polynomial-time (NP) hard, NP complete, or in general, too computationally intensive to be practical. Applying the one-way data transformations may thus render the input data anonymous.

In certain embodiments, the user may input an L-diversity value for a given data set, a K-anonymity value, a generalization hierarchy, or a combination. The techniques described herein may apply the improved anonymization cluster-based process to a non-anonymous data to then result in an anonymized data such that the anonymized data cannot be used to, for example, to recreate the PII In the original non-anonymous data. The improved anonymization cluster-based process may use a graph node clustering approach, as further described below, to derive the anonymized data.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

The virtual servers 26 may store a variety of data, including data that may have Personally Identifiable Information (PII). For example, names, identification data, addresses, medical history, financial history, credit history, employment history, and so on, may be considered PII in certain jurisdictions. Indeed, certain regulations, such as the United States' Health Insurance Portability and Accountability Act (HIPAA), the European Union (EU) data directives, and the like, may specify that some data is to be considered as PII.

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

Figure 2:
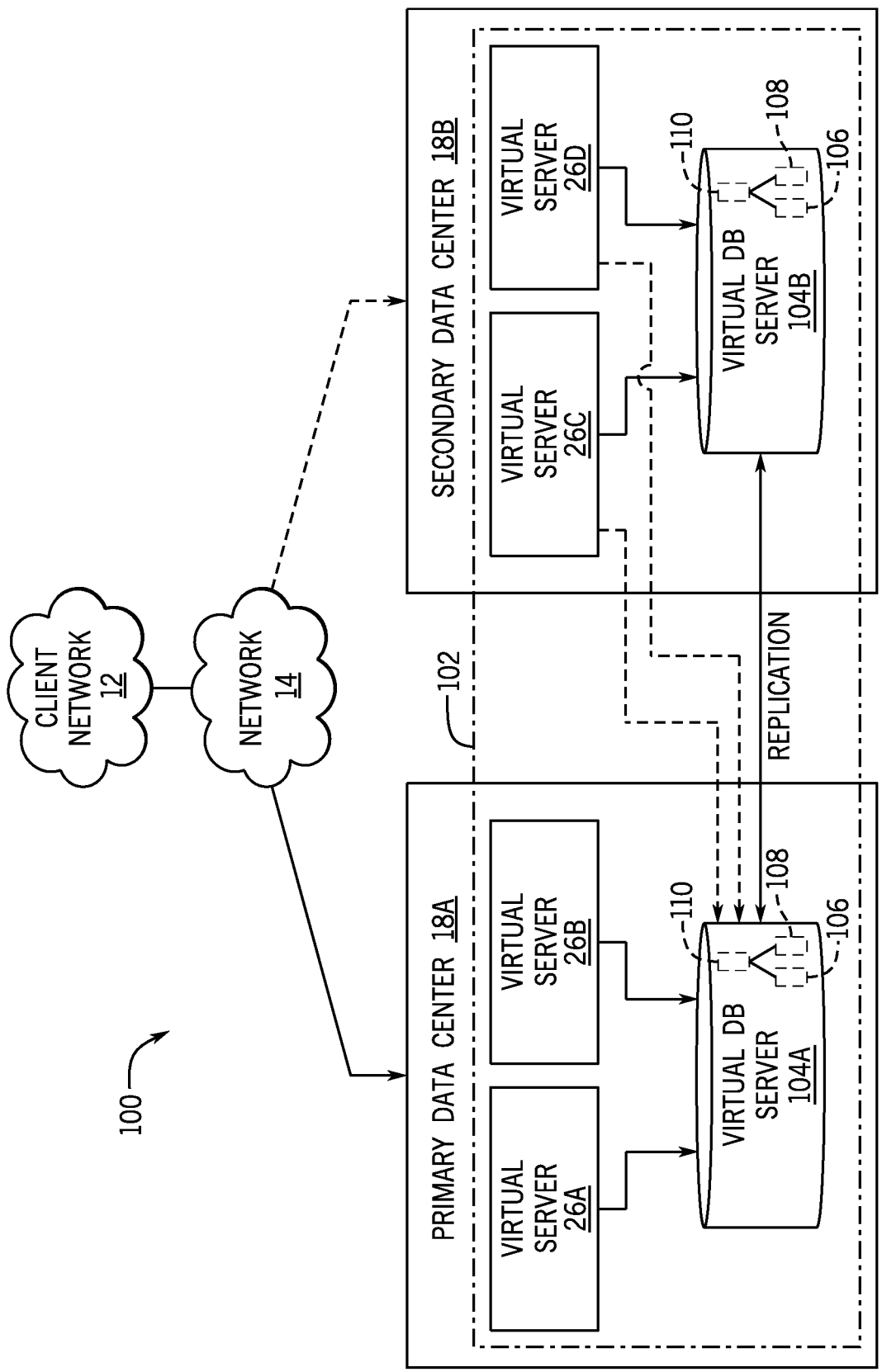
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B.

As shown in FIG. 2, the primary virtual database server 104A may replicate data to the secondary virtual database server 104B using, e.g., a Master-Master MySQL Binlog replication operation. The replication of data between data could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario. Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server instance 104B for processing.

In the depicted embodiment, a database server, such as the servers 104A and/or 104B, may include non-anonymized data 106 having PII. That is, the non-anonymized data 106 may be a data set that may have both non-PII but also PII records. The techniques described herein may transform the non-anonymized data 106 into anonymized data 108, for example, via a computer-implementable anonymization process 110 (e.g., cluster-based process). For example, data clustering may be applied by the anonymization process 110 to the non-anonymized data 106 to create the anonymized data 108. The anonymized data 108 may then be used by other processes.

For example, the anonymized data 108 may be used for deep learning, for statistical analysis, for model building (e.g., building neural networks, data mining models, state vector machine models, statistical models, and so on), and the like, useful in deriving information for a variety of purposes, including business, finance, medical, engineering, construction, and so on. It is also to be understood that the techniques described herein work with any type of database, virtual or otherwise. For example, the non-anonymized data 106 may reside in one database (physical and/or virtual database) and then be converted to anonymized data 108 and stored in a second different database (physical and/or virtual database) and/or also stored in the first database. Indeed, the anonymization techniques may be executed in a server that may be communicatively coupled with and/or that includes the first database, and then the anonymized data 108 may be saved in the first and/or second database also communicatively coupled to the server, such as the servers 104A, 104B.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
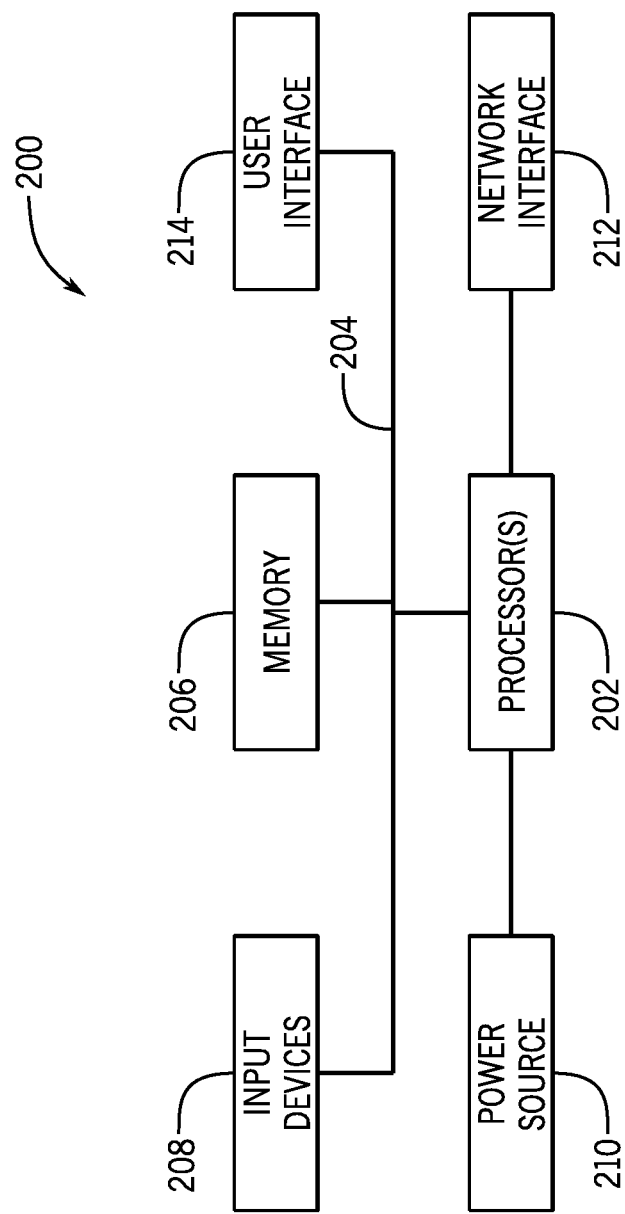
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
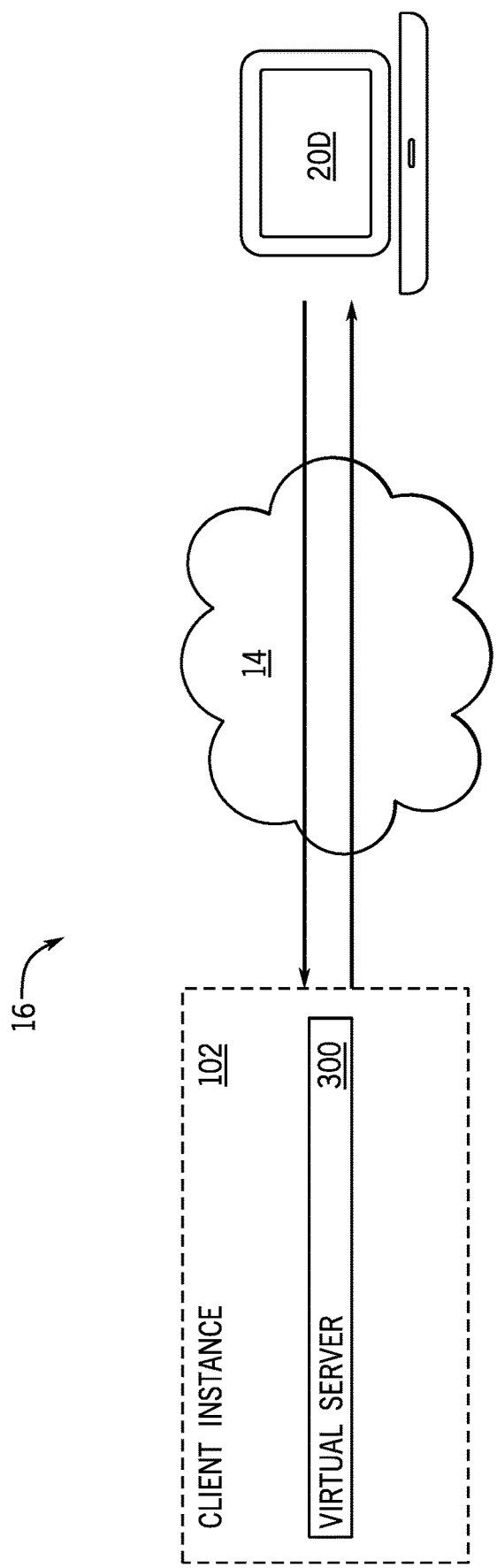
FIG. 4 is a block diagram illustrating an embodiment in which a virtual server supports and enables the client instance of FIG. 2, in which embodiments of the present disclosure may operate

FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
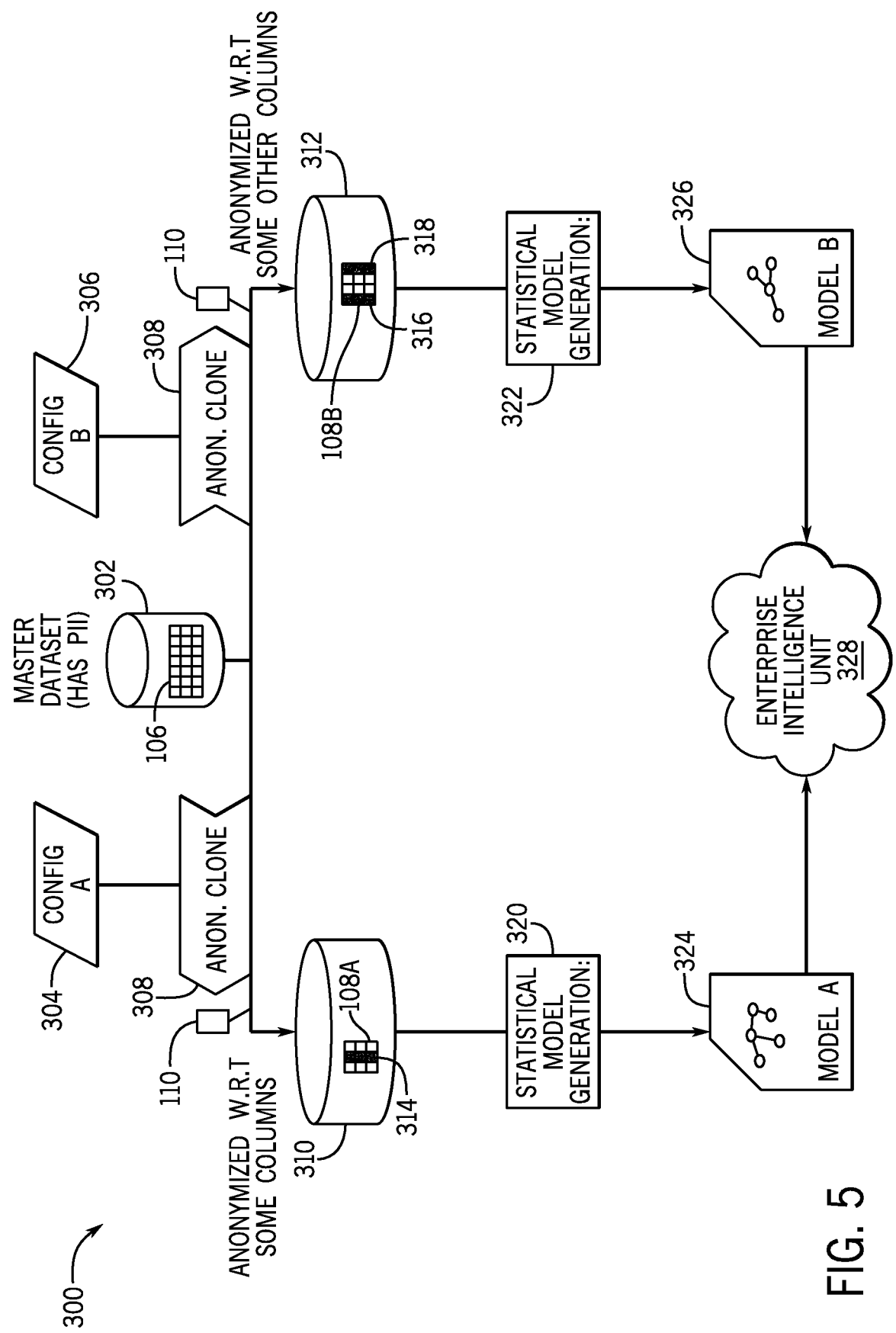
FIG. 5 is an information flow diagram illustrating a process that may be used to transform non-anonymous data into anonymous data, in accordance with an embodiment.

Turning now to FIG. 5, the figure is an information flow diagram illustrating an embodiment of a process 300 that may be used to transform the non-anonymous data 106 into the anonymous data 108 via the anonymization process 110. In the illustrated embodiment, a master dataset 302 includes the non-anonymous data 106. The master dataset 302 may be communicatively coupled to the servers 104 and/or included in the servers 104. A user, such as an information technologist, may create one or more configuration files, such as configuration files A 304, B 306, suitable for anonymizing the non-anonymous data 106. The configuration files A 304 and B 306 may each define a different subset of data in the master dataset 302 to use. The configuration files A 304 and B 306 may include tables, views (e.g., SQL-based views), columns, rows, and the like, to anonymize via the techniques described herein. It is also to be understood that a graphical user interface (GUI), for example, displayable via the user interface 214 may be used to enable the user to input desired anonymization data such as the data subset of the non-anonymized data 106 to use, the type of anonymization to use as further described below, and so on. The GUI may also be used to collect the input data that may then result in the configuration files A 304 and B 306.

The user input for anonymization may also include an L-diversity value to strive for once the data is anonymized. The L-diversity value may be used by the server 104 to derive or to attempt to derive a k-anonymized dataset such that each set of k similar records in the k-anonymized dataset will have at least 1 different or diverse representations for each identifying value (e.g., PII cell). More specifically, combinations of attributes within the data may be used to identify individuals. For example, a statistic given is that 87% of the population of the United States may be uniquely identified by gender, date of birth, and 5-digit zip code. Given a three-attribute "quasi-identifier" based on gender/date of birth/zip code, a dataset that has only one record with any given combination of these three fields is not anonymous, it most likely it identifies someone. Datasets are "k-anonymous" when for any given quasi-identifier (e.g., one or more columns in a database table or combination of columns), a record is indistinguishable from k−1 others.

In L-diversity, if one has a group of k different records that all share a particular quasi-identifier, an attacker usually cannot identify an individual based on the quasi-identifier. But what if the value the attacker is interested in, for example the individual's medical diagnosis, is the same for every value in the group. In one example there may be 7 different values in a group, and the attacker doesn't know which one of them is the person called Adam, but since the attacker knows that all of them are flagged with a diagnosis of cancer, the data has "leaked" that Adam has cancer. This type of attack is usually referred to as a "homogeneity attack." The distribution of target values within a group may be referred herein as "L-diversity". Formally, a definition for an L-diversity value may state that if you let a q*-block be a set of tuples such that its non-sensitive values generalize to q*. A q*-block is 1-diverse if it contains 1 "well represented" values for the sensitive attribute S. A table is 1-diverse, if every q*-block in it is 1-diverse.

In some embodiments, the L-diversity value L, the K-anonymity value K, a generalization hierarchy, or a combination thereof, may be used as input into the anonymization process 110. The user inputs may also include a type of transformation to apply to the data for anonymization. For example, the user may desire to apply a data masking. In data masking, the format of data remains mostly the same; but the data values are changed. The data may be altered in a number of ways, including encryption, character shuffling, and character or word substitution, to provide for a one-way data transformation. Whatever one-way data transformation is chosen, the values are changed in some way that prevents retrieving the original data from the now-transformed data. For example, every character in a name may be replaced by the single 'special' character, such as '*' (or multiple special characters). Thus, "Andrew" would be transformed to "*" and "Betany" would also be transformed to"*", thus providing for a one-way data masking transformation. Special characters may include '*', 'a', '@', and so on.

The user may also desire to apply data morphing. In data morphing, the format of the data may change, while the data values may also change. For example, data may be encrypted, the data may be processed using a hash function, and so on, to provide for a one-way data transformation. Data grouping may also be used to provide anonymization. In grouping, a data record may be changed to reflect an inclusive group that the record belongs to. In other words, related fields in the PII data are grouped into a single field in the anonymized data. For example, data records, "United States", "Mexico", and "Canada" may be all changed to say "North America" because they all are in the North American group of countries. As in data masking, data morphing and data grouping may be one-way data transformations.

In the embodiment depicted in FIG. 5, the user may use the GUI and/or the configuration files A 304, B 306 to extract a subset 308 from the dataset 302. The subset 308, which may contain all or a portion of the data 106, may then be anonymized, via the anonymization process 110, to create anonymized datasets 310 and 312. The anonymized datasets 310 and 312 may include anonymized data 108A and 108B. Indeed, the non-anonymized data 108 may be divided into more than one anonymized data sets, such as datasets 310 and 312. It is to be understood that the anonymized data sets may include data (e.g. columns, rows) that have been transformed via one-way data transformations, as well as data that have not been transformed and contain data originally found in the non-anonymized data 106. As illustrated columns 314, 316, and 318 contain PII in the original dataset 106 and are thus shown as anonymized in the datasets 310, 312.

The anonymized data 108 may then be used for a variety of data analysis. For example, model generation processes 320 and 322 may result in the creation of model A 324 and model B 326, respectively. The model generation processes 320 and 322 may include a variety of modeling process that may be applied for data analysis, such as statistical modeling, deep learning, neural network modeling, state vector machine (SVM) modeling, data mining modeling, physical modeling (e.g., thermodynamic modeling, finite element analysis modeling), and so on. Once the models 324, 326 are created, the models may be used by a business intelligence unit 328 to derive a variety of results, such as medical results, business results, engineering results, econometric results, and so on.

Figure 6:
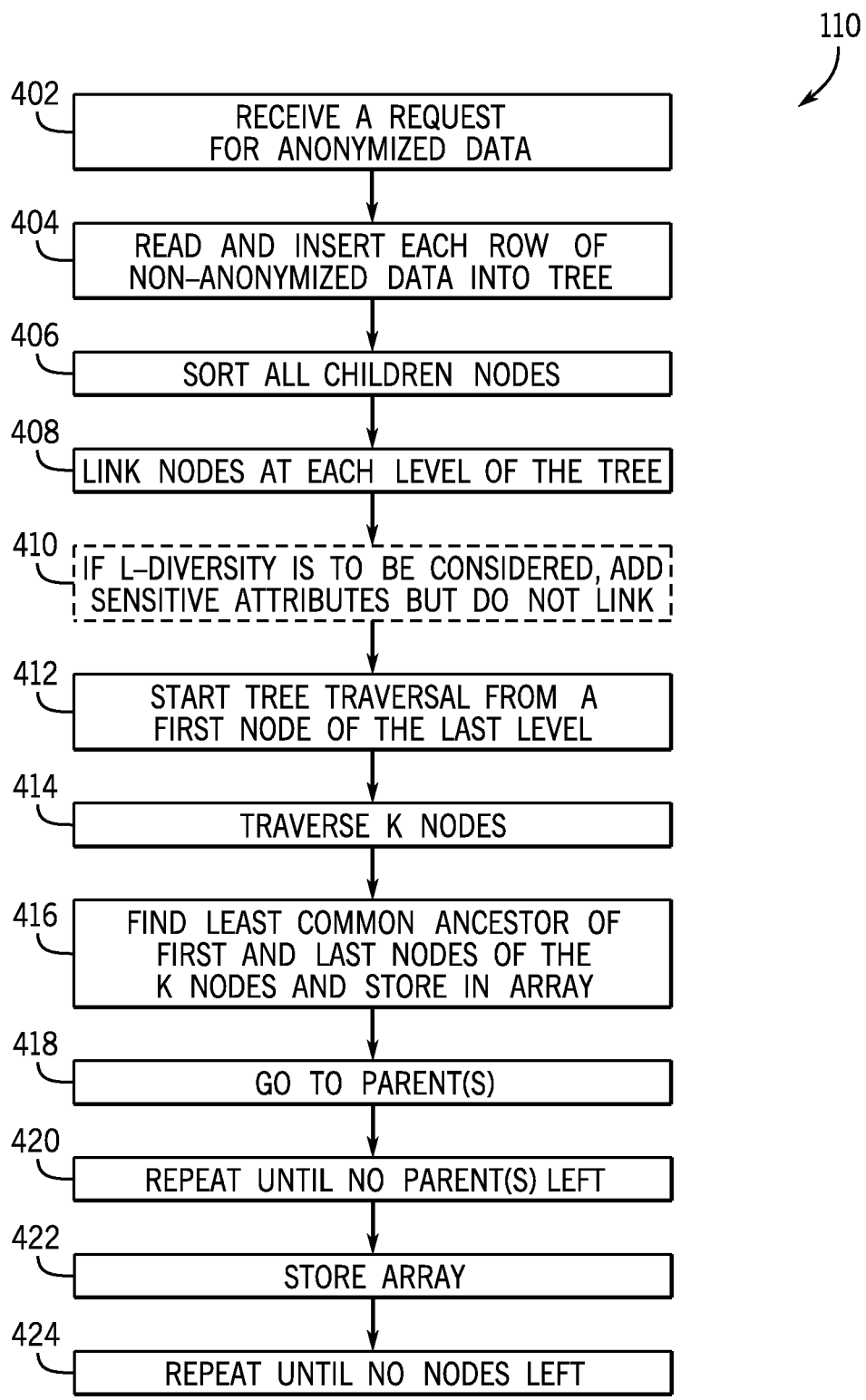
FIG. 6 is a flowchart depicting a cluster-based process suitable for creating an anonymized data repository from a non-anonymized data repository, in accordance with an embodiment.

FIG. 6 is a flowchart depicting an embodiment of the anonymization process 110 (e.g., cluster-based process) suitable for creating an anonymized clone from a non-anonymized data repository. The anonymization process 110 may be implemented as executable computer instructions or code executable, for example, via physical and/or virtual servers 26. In the depicted example, the anonymization process 110 may first receive (block 402) a request for the creation of an anonymized data 108. For example, the request may include the subset 308. The request may also include the L-diversity value L, the K-anonymity value K, or a combination thereof, to apply to the subset 308. The request may additionally include a database table having PII columns to anonymize, a view (e.g., SQL-based view), a set of columns, rows, and so on, which may be based on the non-anonymized data 106. The request may also include data transformations to apply to the PII columns, such as data masking, data morphing, data grouping, and so on. The request may also include one or more generalization hierarchies of the non-sensitive attributes (e.g., attributes that are okay to display as-is) and/or a priority among the attributes, as shown in FIG. 7.

Figure 7:
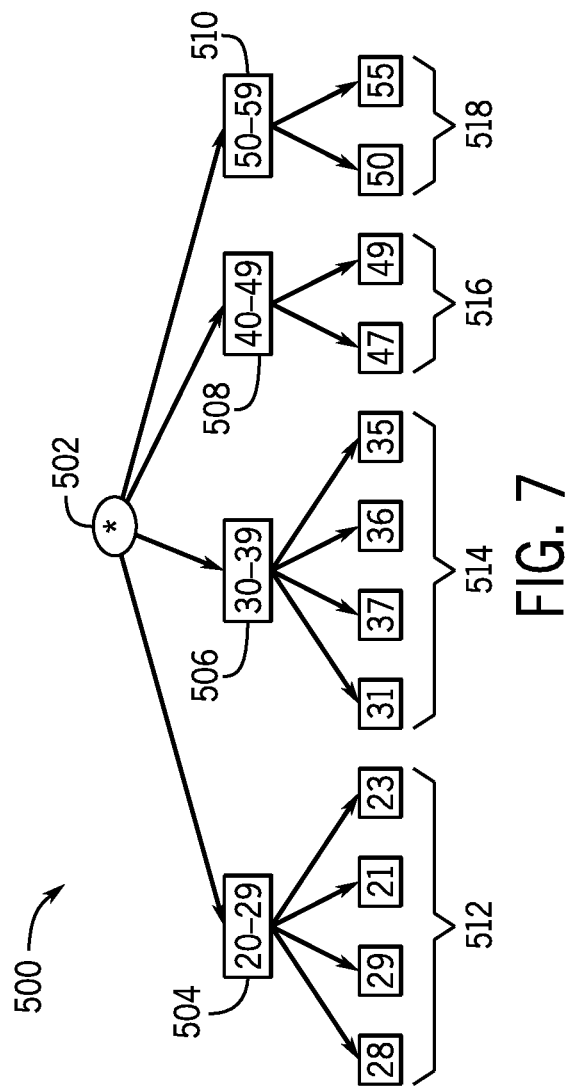
FIG. 7 is an embodiment of a generalization hierarchy that may be used as input into the cluster-based process of FIG. 6, in accordance with an embodiment.

More specifically, FIG. 7 illustrates an embodiment of a generalization hierarchy 500 that may be used as input into the anonymization process 110. The generalization hierarchy may be a graph-based tree having at least one level of children, but may have multiple levels. Each level "generalizes" or categorizes certain non-sensitive attributes, such as age, zip codes, state of residence, and so on. In the depicted embodiment, a root node 502 is included in a first layer, while a second layer includes three children nodes 504, 506, 508, and 510 of the root node 502 representative of age ranges 2029, 3039, 4049, and 5059, respectively. A third layer includes children nodes of the second layer, with non-anonymized data 106. In the depicted embodiment, children 512 are associated with node 504, children 514 are associated with node 506, children 516 are associated with node 508, and children 518 are associated with node 510. As noted previously, the generalization hierarchy 500 may be used as input into the anonymization process 110. More specifically, the generalization hierarchy 500 may be used as "scaffolding" to build and then to traverse a graph-based tree structure during anonymization derivations, as further described below.

Turning back to FIG. 6, the anonymization process 110 may, after receipt of the request for anonymized data (block 402) may read from each row of the non-anonymized data 106, and insert the row into a tree (block 402) of a generalization hierarchy, such as the hierarchy 500. For example, consider the following data set 106:

TABLE 1

Example non-anonymized data set

| | Non-Sensitive | | | Sensitive |
|---|---|---|---|---|
| | Zip Code | Age | Nationality | Condition |
| 1 | 13053 | 28 | Russian | Heart Disease |
| 2 | 13068 | 29 | American | Heart Disease |
| 3 | 13068 | 21 | Japanese | Viral Infection |
| 4 | 13053 | 23 | American | Viral Infection |
| 5 | 13053 | 50 | Indian | Cancer |
| 6 | 13053 | 55 | Russian | Heart Disease |
| 7 | 13050 | 47 | American | Viral Infection |
| 8 | 13050 | 49 | American | Viral Infection |
| 9 | 13053 | 31 | American | Cancer |
| 10 | 13053 | 37 | Indian | Cancer |
| 11 | 13068 | 36 | Japanese | Cancer |
| 12 | 13068 | 35 | American | Cancer |

Figure 8:
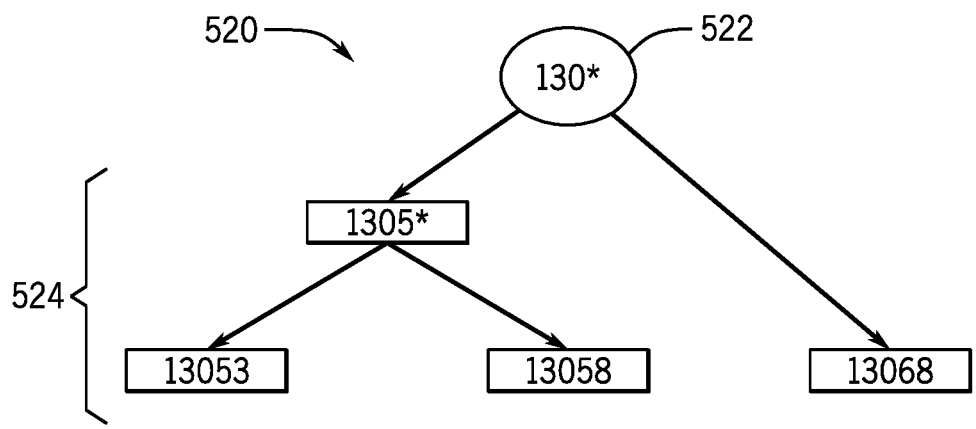
FIG. 8 is an embodiment of a generalization hierarchy using Zip code as an attribute, in accordance with an embodiment.
Figure 9:
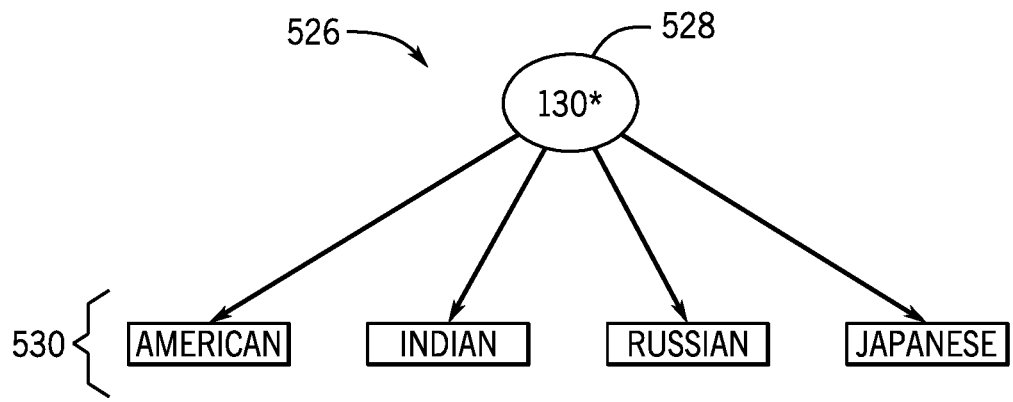
FIG. 9 is an embodiment of a generalization hierarchy using nationality as an attribute, in accordance with an embodiment.
Figure 10:
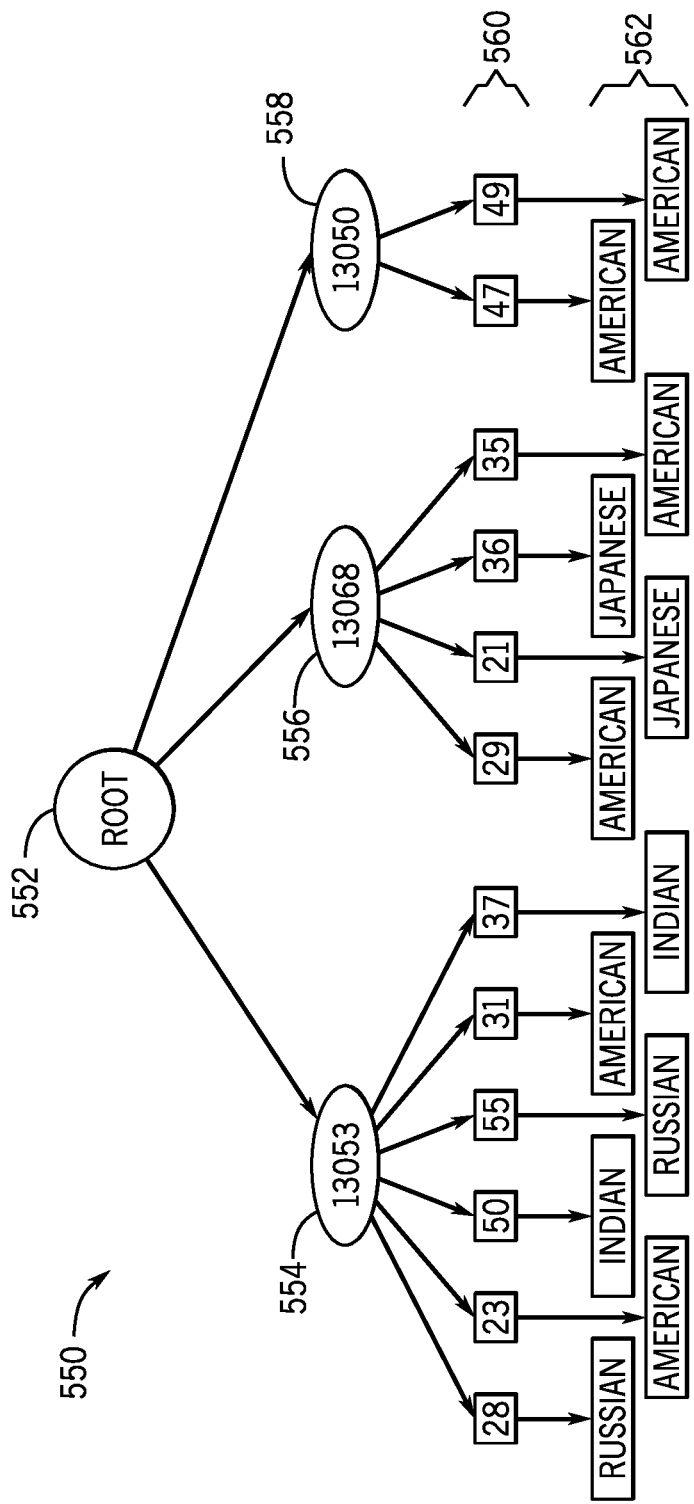
FIG. 10 illustrates a graph-based tree depicting a root node having three children nodes, in accordance with an embodiment.
Figure 11:
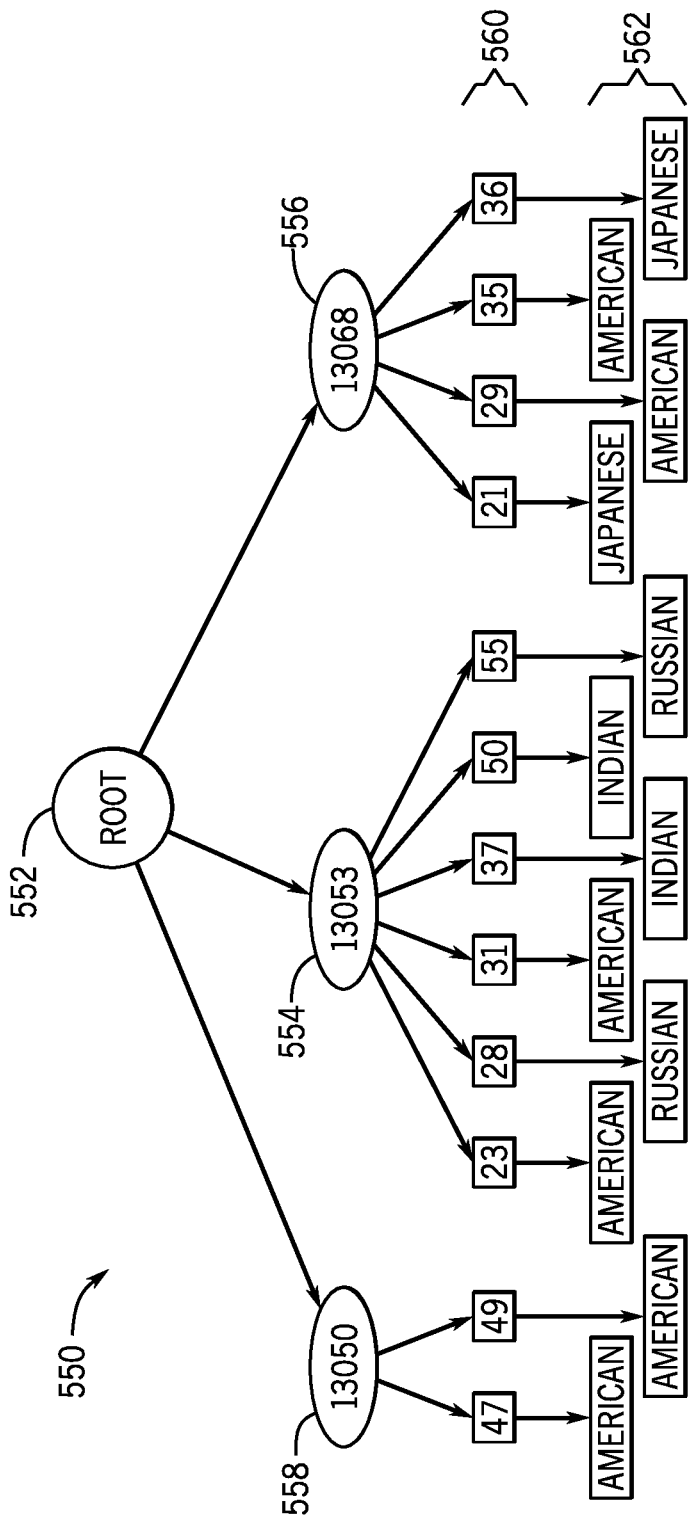
FIG. 11 illustrates a graph-based tree depicting a sorting of nodes, in accordance with an embodiment.

While FIG. 7 illustrates one possible generalization hierarchy for the attribute of "Age" in Table 1, other hierarchies may be used. For example, FIG. 8 illustrates an embodiment of a generalization hierarchy 520 for Zip codes. In the illustrated embodiment, a root 522 includes only three zip code digits, and subsequent children may then include more digits, such as four digit or more digits for children 524. Likewise, FIG. 9 illustrates an embodiment of a generalization hierarchy 526 for nationality. In the depicted embodiment, a root 528 representative of all nationalities may then expand, via children 530, to list individual nationalities, e.g., American, Indian, Russian, Japanese, and so on.

Figure 14:
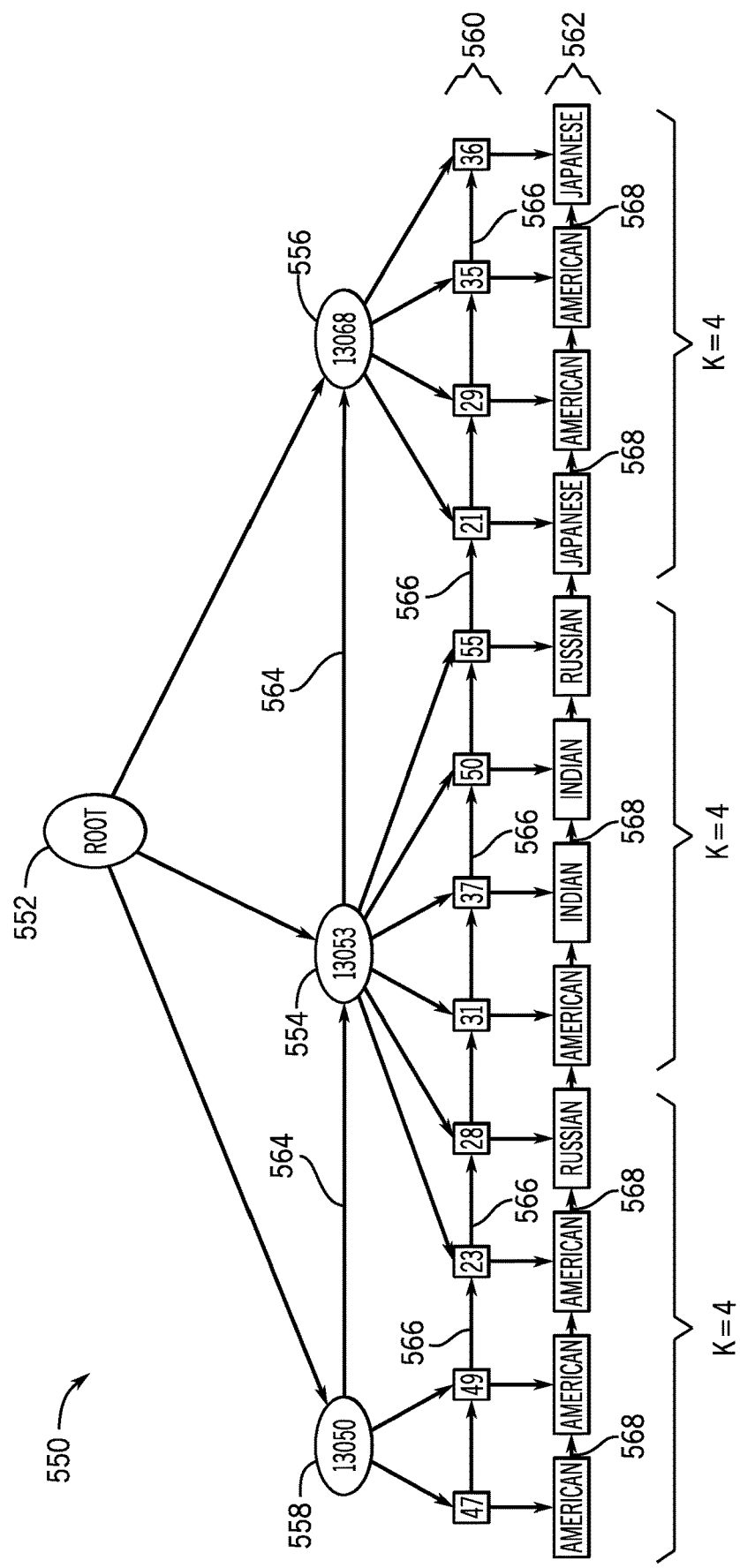
FIG. 14 illustrates a graph-based tree depicting a clustering of nodes, in accordance with an embodiment.

The anonymization process 110 may read each row 1-12 and insert the corresponding row data as shown in FIG. 14. More specifically, FIG. 14 depicts an example graph-based tree 550 illustrating a root node 552 having three children 554, 556, and 558. The children 554, 556, and 558 are shown as representative of the zip codes of Table 1 above. The nodes 554, 556, and 558 may then include respective ages disposed as children 560. In turn, children 560 may have children 562 representative of a nationality, e.g., Russian, American, Indian, Japanese, as illustrated. As mentioned earlier, the tree 550 may be created based on a generalization hierarchy. In the depicted embodiment of FIG. 14, the root 552 and first level of the tree 550, including nodes 554, 556, and 558, may have been inputted as the generalization hierarchy for the tree 550. The anonymization process 110 may then insert remaining data to complete the tree 550 (block 404).

Figure 13:
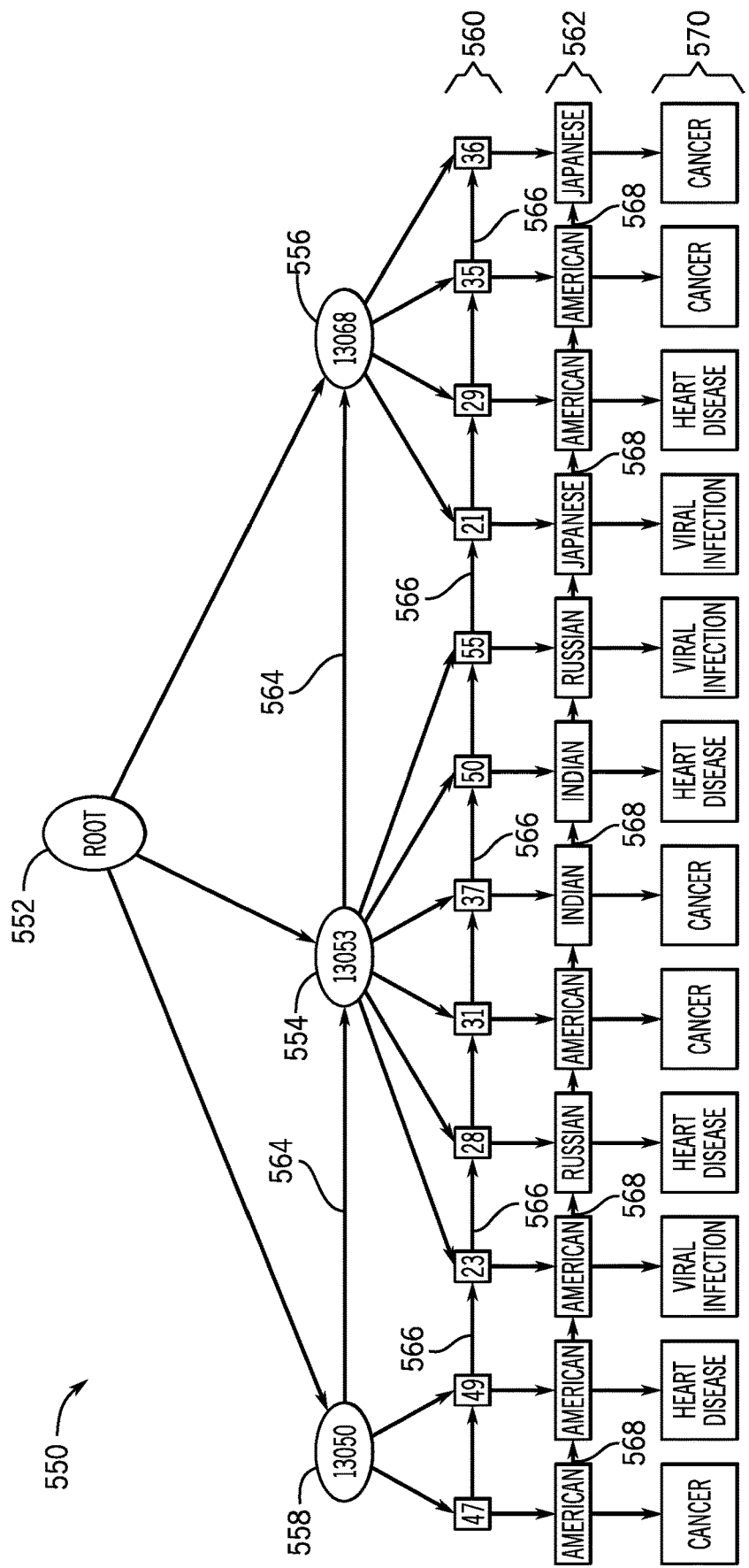
FIG. 13 illustrates a graph-based tree depicting additional children nodes, in accordance with an embodiment.

Turning now back to FIG. 6, the anonymization process 110, after reading and inserting (block 404) the rows of the non-anonymized data set 106 into the tree 550 may then sort (block 406) all of the children nodes of the tree 550. FIG. 13 illustrates a sorting of the children nodes 554, 556, 558, 560, and 562. The sort is based on user input in the form that the sorting should be in the order of the leaf nodes of the corresponding generalization hierarchy tree. For example, for age column(attribute), the sorting order should be according to the leaf nodes of the tree in FIG. 7—Accordingly, sorting may include but not be limited to sorts that use ascending and/or descending rankings (e.g., ascending numbers, ascending letters, descending numbers, descending letters), health-based rankings, e.g., World Health Organization (WHO) rankings, Center for Disease Control (CDC) rankings, custom rankings, and so on.

The anonymization process 110 may then link (block 408) all the nodes at each level of the tree 550. For example, FIG. 14 illustrates and embodiment of the tree 550 with links added to each level below the root node 552. In the depicted embodiment, links 564 are used to link children 554, 556, and 558 disposed in a first level of the tree 550. Likewise, links 566 are shown, linking the children 560 disposed in a second level of the tree 550. Similarly, links 568 are shown, linking the children 562 disposed in a third level of the tree 550. Turning back to FIG. 6, when L-diversity is to be considered, the tree 550 may also include "sensitive" attributes, which may then be added (block to the tree 550 as shown in FIG. 13.

More specifically, FIG. 13 shows an embodiment of the tree 550 with a "condition" sensitive attribute added as children 570. Indeed, each row of the non-anonymized data set 106 may include one or more sensitive attributes that may then be represented in the hierarchical tree via children disposed in one or more layers. For example, if a second sensitive attribute were to be used, the second sensitive attribute may be added into the tree 550 as children of the sensitive attribute nodes 570. The sensitive attributes may be added last to the tree 550, with non-sensitive attributes added first.

Turning back to FIG. 6, once the tree 550 is constructed, e.g., with or without sensitive attributes, the anonymization process 110 may then start traversing (block the tree 550 at the first (e.g., left-most node) in the last level. The anonymization process 110 may then traverse (block 414) K nodes, where K is a desired K-anonymity value. That is, the last level nodes may be subdivided into clusters or subsets having K nodes each (or more than K nodes for the last cluster only) If last cluster has less than K nodes then they are combined with previous cluster to ensure K-anonymity. For the K nodes being traversed in a cluster or subset, the anonymization process 110 may find (block 416) a least common ancestor (e.g., parent, grandparent, great grandparent) of all of the K nodes in the corresponding generalization hierarchy tree. We would need to find the least common ancestor of only the first and last nodes if the selected cluster consists of nodes that are consecutive at their level. The least common ancestor may then be stored in memory, such as in an array (block 416). The anonymization process 110 may then go to one or more parents (block 418) of all the K nodes and repeat block 416 until we reach the root of the cluster. That is, any parents of the least common ancestor may be found by going up a level from any links into the least common ancestor. The parent(s) may then be processed as described above beginning with respect to block 412. That is, K parent nodes may be traversed beginning with a first (e.g., left most) node. The anonymization process 110 may then repeat (block 420) operations until there are no parents left to process. The anonymization process 110 may then store (block 422) the array that has all of the common ancestors, and repeat (block 424) processing starting at block 408 until there are no more nodes to process.

Figure 12:
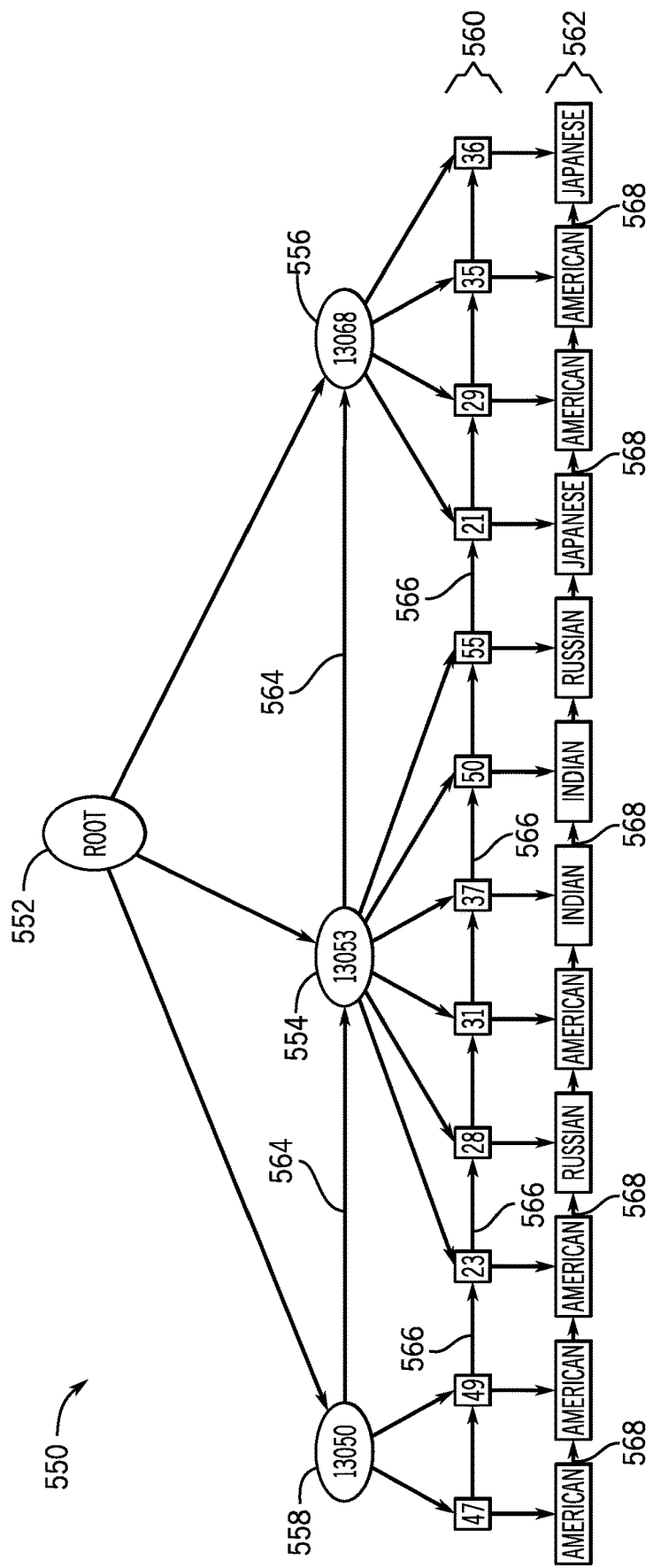
FIG. 12 illustrates a graph-based tree depicting a linking of nodes, in accordance with an embodiment.

For example, when the first cluster of K (=4) is picked in FIG. 12, the Nationality column of 4 rows is determined by looking at the least common ancestor of ("American", "American", "American", "Russian") in the generalization hierarchy of Nationality attribute in FIG. 7.3. Likewise, the Age column is determined by the least common ancestor of (47, 49, 23, 28) in the generalization tree of Age attribute as seen in FIG. 7.1. Also, the Zip Code column is determined by the least common ancestor of (13050, 13053) in the generalization tree of Zip Code attribute in FIG. 7.2.

FIG. 14 illustrates an example of the tree 550 showing a subdivision of the K nodes as mentioned earlier. More specifically, the children nodes 562 have been sorted and then connected via the links 568. The children nodes 562 have then been divided into 3 clusters or subsets of K=4 nodes each. As described above with respect to the anonymization process 110, nodes may be processed via clustering of K with a desired value, e.g., K-anonymization value. When the anonymization process 110 is applied to Table 1 listed above, the result is Table 2 as follows:

TABLE 2

Example non-anonymized data set based on Table 1

| | Non- Sensitive | | Sensitive |
|---|---|---|---|
| Zip Code | Age | Nationality | Condition |
| 1305* | * | * | Cancer |
| 1305* | * | * | Heart Disease |
| 1305* | * | * | Viral Infection |
| 1305* | * | * | Heart Disease |
| 13053 | 20-60 | * | Cancer |
| 13053 | 20-60 | * | Cancer |
| 13053 | 20-60 | * | Heart Disease |
| 13053 | 20-60 | * | Viral Infection |
| 13068 | 20-40 | * | Viral Infection |
| 13068 | 20-40 | * | Heart Disease |
| 13068 | 20-40 | * | Cancer |
| 13068 | 20-40 | * | Cancer |

It is to be noted that the anonymized data 108 may additionally or alternatively be stored in a temporary memory (e.g., RAM, temporary file, and so on). As mentioned earlier, the anonymized repository may be used for a variety of purposes, including medical analysis, business analysis, engineering analysis, econometrical analysis, and so on. By providing for anonymous data 108, the analysis may comply with privacy laws and regulatory entities in various jurisdictions.

It is also to be noted that the creation of the anonymous data 108 may be done as part of a hardware or software component. For example, the software component may be a function, a class, a module, and so on, that may execute the anonymization process 110. The software component may take as input the configuration files 304, 306, the L-diversity value, the k-anonymity value, the type of anonymity transformation to apply (e.g., data mapping, data morphing, and/or data grouping) and so on, and then as output create the anonymized data 108. Accordingly, the software component may be used as part of any software process that would benefit from anonymization. By calling the software component, a variety of processes may more easily derive the anonymized data 108.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
an anonymizer server communicatively coupled to a data repository configured to store a personal identification information (PII) data, wherein the anonymizer server is configured to perform operations comprising:
receiving an anonymized data request, wherein the anonymized data request comprises a graph-based tree for an anonymized data repository, wherein the graph-based tree comprises all nodes representative of non-sensitive attributes, and wherein the anonymized data repository comprises a database table; and
creating the anonymized data repository based on the anonymized data request;
anonymizing the PII data to create an anonymized data by applying a cluster-based process; and
storing the anonymized data in the anonymized data repository.

2. The computing system of claim 1, wherein the anonymized data request comprises an L-diversity value, a K-homogeneity value, or a combination thereof, for the anonymized data repository.

3. The computing system of claim 1, wherein the nodes comprise a plurality of children nodes based on the PII data.

4. The computing system of claim 3, wherein the plurality of children nodes are divided into a plurality of clusters with each cluster having at least K children nodes.

5. The computing system of claim 3, wherein applying the cluster-based process comprises sorting all children nodes after creating the graph-based tree and linking all nodes that share the same level in the graph-based tree.

6. The computing system of claim 5, wherein applying the cluster-based process comprises adding sensitive attributes as a last level of the graph-based tree if L-diversity is included in the anonymized data request.

7. The computing system of claim 6, wherein the cluster-based process comprises:
starting a traversal of the graph-based tree from a first node of the last level of nodes;
traversing at least K nodes;
finding a least common ancestor of the first node and a last node of the at least K nodes; and
storing the least common ancestor.

8. The computing system of claim 7, wherein the cluster-based process comprises:
navigating to each parent of the least common ancestor; and for each parent:
starting a traversal of the graph-based tree from a first parent node of a last parent level of nodes;
traversing at least K parent nodes;
finding a least parent common ancestor of the first parent node and a last parent node of the at least K parent nodes; and
storing the least parent common ancestor.

9. A method, comprising:
receiving, at an anonymizer server communicatively coupled to a data repository configured to store a personal identification information (PII) data, an anonymized data request;
creating an anonymized data repository based on the anonymized data request;
anonymizing the PII data to create an anonymized data by applying a cluster-based process, wherein applying the cluster-based process comprises:
creating a graph-based tree having a plurality of children nodes based on the PII data, wherein the plurality of children nodes are divided into a plurality of clusters with each cluster having at least K children nodes; and
sorting the plurality of children nodes after creating the graph-based tree and linking the plurality of children nodes that share the same level in the graph-based tree; and
storing the anonymized data in the anonymized data repository.

10. The method of claim 9, wherein the anonymized data request comprises an L-diversity value, a K-anonymity value, a generalization hierarchy for each attribute to be anonymized, or a combination thereof, for the anonymized data repository.

11. The method of claim 9, wherein applying the cluster-based process comprises:
adding sensitive attributes as a last level of the graph-based tree if L-diversity is included in the anonymized data request;
starting a traversal of the graph-based tree from a first node of the last level of nodes;
traversing at least K nodes;
finding a least common ancestor of the first node and a last node of the at least K nodes; and
storing the least common ancestor.

12. The method of claim 11, wherein applying the cluster-based process comprises:
navigating to each parent of the K nodes; and for each parent:
starting a traversal of the graph-based tree from a first parent node of a last parent level of nodes;
traversing at least K parent nodes;
finding a least parent common ancestor of the first parent node and a last parent node of the at least K parent nodes; and
storing the least parent common ancestor.

13. A non-transitory, computer-readable medium storing instructions executable by a processor of a computing system, the instructions configured to:
receive, at an anonymizer server communicatively coupled to a data repository configured to store a personal identification information (PII) data, an anonymized data request;
create an anonymized data repository based on the anonymized data request;
anonymize the PII data to create an anonymized data by applying a cluster-based process, wherein applying the cluster-based process comprises:
creating a graph-based tree having a plurality of children nodes based on the PII data, wherein the plurality of children nodes are divided into a plurality of clusters with each cluster having at least K children nodes; and
sorting the plurality of children nodes after creating the graph-based tree and linking the plurality of children nodes that share the same level in the graph-based tree; and
store the anonymized data in the anonymized data repository.

14. The computer-readable medium of claim 13, wherein the anonymized data request comprises an L-diversity value, a K-anonymity value, a generalization hierarchy, or a combination thereof, for the anonymized data repository.

15. The computer-readable medium of claim 13, wherein the instructions configured to apply the cluster-based process comprise instructions configured to:

add sensitive attributes as a last level of the graph-based tree if L-diversity is included in the anonymized data request;
start a traversal of the graph-based tree from a first node of the last level of nodes;
traverse at least K nodes;
find a least common ancestor of the first node and a last node of the at least K nodes; and
store the least common ancestor.

16. The computer-readable medium of claim 15, wherein the instructions configured to apply the cluster-based process comprise instructions configured to:
navigate to each parent of the least common ancestor; and
for each parent:
start a traversal of the graph-based tree from a first parent node of a last parent level of nodes;
traverse at least K parent nodes;
find a least parent common ancestor of the first parent node and a last parent node of the at least K parent nodes; and
store the least parent common ancestor.

\* \* \* \* \*